US007337334B2

(12) United States Patent
Kuhlmann et al.

(10) Patent No.: US 7,337,334 B2
(45) Date of Patent: Feb. 26, 2008

(54) NETWORK PROCESSOR POWER MANAGEMENT

(75) Inventors: Charles E. Kuhlmann, Raleigh, NC (US); Thomas A. Millard, Cary, NC (US); Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/367,067

(22) Filed: Feb. 14, 2003

(65) Prior Publication Data

US 2004/0163000 A1 Aug. 19, 2004

(51) Int. Cl.
*G06F 1/32* (2006.01)
*G06F 1/26* (2006.01)

(52) U.S. Cl. ..................... 713/300; 713/323
(58) Field of Classification Search ............... 713/300, 713/310, 320, 321, 322, 323, 324, 330, 340
See application file for complete search history.

(56) References Cited

U.S. PATENT DOCUMENTS

| | | | |
|---|---|---|---|
| 4,312,035 A | 1/1982 | Greene .................... 364/200 |
| 4,679,191 A | 7/1987 | Nelson et al. ............... 370/84 |
| 5,251,320 A | 10/1993 | Kuzawinski et al. ........ 395/750 |
| 5,469,542 A | 11/1995 | Foster et al. .......... 395/200.01 |
| 5,675,814 A | 10/1997 | Pearce ..................... 395/750 |
| 5,691,948 A | 11/1997 | Sakabe ..................... 365/227 |
| 5,737,615 A | 4/1998 | Tetrick ................. 395/750.06 |
| 5,954,820 A * | 9/1999 | Hetzler ..................... 713/323 |
| 5,983,357 A | 11/1999 | Sun ......................... 713/324 |
| 6,125,450 A | 9/2000 | Kardach .................... 713/323 |
| 6,128,746 A | 10/2000 | Clark et al. ................ 713/324 |
| 6,161,187 A | 12/2000 | Mason et al. .............. 713/322 |
| 6,202,097 B1 | 3/2001 | Foster et al. ............... 709/238 |
| 6,657,634 B1 * | 12/2003 | Sinclair et al. ............. 345/534 |
| 6,885,974 B2 * | 4/2005 | Holle ....................... 702/182 |
| 2002/0049892 A1 * | 4/2002 | Saulsbury et al. ............ 712/1 |
| 2002/0194509 A1 * | 12/2002 | Plante et al. ............... 713/300 |
| 2004/0003303 A1 * | 1/2004 | Oehler et al. .............. 713/300 |

FOREIGN PATENT DOCUMENTS

JP   PUPA 10-91298   4/1998

OTHER PUBLICATIONS

IBM PowerNP NP4GS3 "Network Processor", 1. General Information, and 2. Physical Description, Feb. 15, 2002, pp. 27-39.

* cited by examiner

*Primary Examiner*—Rehana Perveen
*Assistant Examiner*—Fahmida Rahman
(74) *Attorney, Agent, or Firm*—Joscelyn G. Cockburn; James A. Lucas; Driggs, Hogg & Fry Co., LPA

(57) ABSTRACT

A programmable state machine is incorporated into the core of a network processor (NP) to monitor the utilization of different processing elements in the NP and to control the power state of each element as a function of past and predicted utilization. The state machine can be used to control a centralized power management control unit or to control a distributed power management unit where each processing element includes its own state machine. The function of the power management state machine can be implemented in any combination of software and/or hardwired logic, depending on the system design requirements. The monitoring and control are implemented through the use of a power management state change algorithm. The determination of the power state of a processing element accommodates interdependencies between the elements. It also makes adjustments in gain factors in response to actual performance and utilization of the network processor.

11 Claims, 8 Drawing Sheets

NETWORK PROCESSOR POWER MANAGEMENT

FIELD OF THE INVENTION

The present invention relates to a system and method of controlling power consumption within a network processor while maintaining an acceptable level of performance.

BACKGROUND OF INVENTION

Several trends in the communications industry are contributing to make the efficient use of power a top issue in the design of network system components. As bridging, switching and routing systems increase in performance, their power requirements also increase. An increase in power adversely affects product features, such as cost and reliability. Costs are increased, for example, by the requirements of larger power supplies and fans. Reliability is compromised by the potential of hotter components. The power increase also adversely affects operating environment features by driving higher utility costs and higher installation and maintenance costs, such as building cooling, space needs and battery backup requirements. On the other hand, network system components which run cool provide many important benefits, including the ability to pack more ports into a smaller space and still stay within thermal operating limits, and the capability to stay online longer, perhaps with reduced capacity, in a battery back-up mode when main power fails.

Previously wired solutions for network communication are moving to wireless equipment for ease of use and mobility. Wireless devices abound today and will only increase in the future via analog and digital handheld phones, personal digital assistants (PDAs), laptops, subnotebooks, electronic books, etc. Most of these devices presently communicate or will communicate using wireless technologies, such as cellular, digital/PCS, 802.11, Bluetooth™, etc. Internet access is being enabled on most of these devices today or in the near future. New, data intensive features like web browsing and instant messaging are being added just as fast as improvements in low power hardware integration will allow. Network system components, such as network processors (NP) now used in powerful routing equipment today, may be used in small, mobile devices in the future provided that the technology is properly designed for low power applications.

The amount of power that a device uses often varies greatly between passive use (such as a cellular phone in standby mode or a laptop computer in sleep mode) and active use (such as placing a call on a cellular phone or running an application on a laptop computer). Power management features allow a device to conserve power using different operational modes, such as standby or sleep. In these types of power modes, most of a device can be powered off with the state saved, parts of the device can be powered off with allowance for a wake-up by another part of the device, or parts of the device can be run at lower power during periods of low usage. These power-conserving operational modes can be used to greatly increase the battery life of the device and the amount of time that the device can be in standby or can be used actively.

Due to the increasingly networked nature of wireless battery-powered devices (such as higher bandwidth requirements for multimedia and the addition of Internet support and applications), there is more of a need than ever to add networking assists or network processing functionality into these devices while leaving the General Purpose Processor (GPP) free to run applications. This drives the need for power-efficient network processors (NPs) and the use of power-saving techniques in the design of these network processors.

These same power-saving features can be used in wired devices for battery-backup modes when there is a loss of power. An example would be a small-office/home-office (SOHO) router which is used to provide voice lines to a residence using Voice over Packet or Voice over ATM (asynchronous transfer mode) technology. In the United States, such a device must provide eight hours of "talk" time and 24 hours of standby from a battery in case of a power failure to ensure 911 emergency support.

These features can also be used in wired devices just to save electricity, which lowers operational expenses and is environmentally friendly. The use of advanced power management techniques according to the present invention will also improve thermal characteristics for high density network processor applications in telco racks by reducing typical power requirements. Carrier companies are asking for higher port densities to handle rapidly increasing volumes of voice and data traffic. These same companies are very sensitive to increase in overhead expenses due to floor space requirements for network equipment racks. It is becoming increasingly important for network equipment manufacturers to pack more network traffic processing capability into smaller spaces. Hence, the network processors used in this network equipment need to become more power efficient.

BRIEF DESCRIPTION OF INVENTION

The present invention relates to a programmable state machine included in an NP core for the purpose of monitoring the utilization of different processing elements in the NP and controlling the power state of each element as a function of past and predicted utilization. The invention utilizes a PM state control algorithm, run by a hardware or software state machine for determining when a processing element is to be set to a lower power state based on a historical measurement of a device and/or system utilization. State control logic accounts for dependencies between system elements before adjusting power states. Each processing element employs a usage indication signal that feeds a counter which is used as the algorithm that measures utilization levels. The invention is applicable to a centralized power management (PM) control unit, as well as a distributed PM approach, where each processing element includes its own state machine.

The invention relates to a system and method of controlling power consumption within a network processor while maintaining an acceptable level of performance. The method utilizes a programmable state machine that is added to an NP core. The state machine is capable of monitoring the utilization of different processing elements in the NP and controlling the power state of each element as a function of past and predicted future utilization. The system can further include the capability of determining when a processing element is to be set to a lower power state, for example, based upon the prior utilization of the processing element, or upon the interdependencies between processing elements. For elements that are clocked, the performance recovery time associated with each of the clocked processing elements is factored into the step of controlling the power state of the respective processing element. The system can also include a smoothing step to account for the processing element recovery time. Gain factors can be adjusted in response to actual performance and utilization of the network processor.

The invention also relates to a computer-readable medium for managing the power consumption of a system of multiple processing elements. The medium determines when each element in the system should be run based on a historical pattern of system utilization. It factors element interdependencies into power consumption requirements of each element and records utilization levels of each processing element.

DETAILED DESCRIPTION OF THE INVENTION

Figure 1:
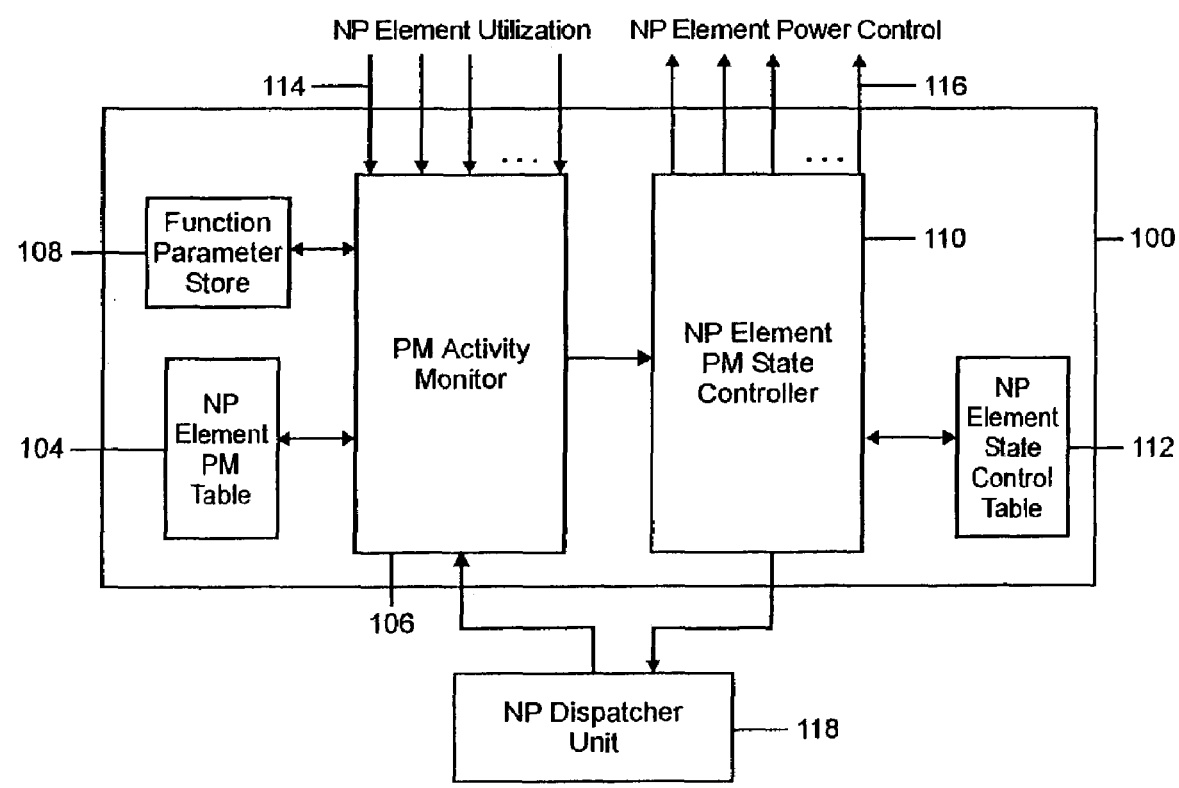
FIG. 1 is a block diagram of an integrated power management unit.

A network processor is embedded in a semiconductor chip within an NP complex. The complex includes off-chip storage for the NP including DRAM and SRAM storage devices and data storage. It also supports a plurality of physical layer devices, such as 10/100 Mbps and 1 Gbps Ethernet, 16 Mbps Token-Ring, 200 Mbps fiber channels, SONET (synchronous optical network) and the like.

The functional blocks of such a network processor are shown and described in greater detail on pages 27-39 of a public document entitled "IBM PowerNP™ NP4GS3 Network Processor", the relevant portions of which are reproduced herein as follows. The processor contains an Embedded Processor Complex (EPC) in which processors and coprocessors work with hardware accelerators to increase processing speed and power. Additional features, such as integrated search engines, variable packet length schedulers, and support for QoS functions, support the needs of users who require high function, high capacity, media-rate switching.

The EPC is the heart of the NP4GS3 network processor, evaluating, defining, and processing data. It maximizes the speed and processing power of the device and provides it with functionality above that of an independent switching device. Within the EPC, eight dyadic protocol processor units (DPPUs) combine picocode processors, copro-cessors, and hardware accelerators to support functions, such as high-speed pattern search, data maniDulation. internal chip management, frame parsing, and data prefetching.

This network processor provides fast switching by integrating switching engine, search engine, and security functions on one device. It supports Layer 2 and 3 Ethernet frame switching, and includes three switch priority levels for port mirroring, high priority user frames, and low priority frames. It supports Ethernet, packet over SONET (POS). and Point-to-Point Protocol (PPP) protocols. Because of the device's ability to enforce hundreds of rules with complex range and action specifications, NP4GS3-based systems are uniquely suited for server clusters.

Systems developed with this network processor use a distributed software model. To support this model, the device hardware and Code Development Suite include on-chip debugger facilities, a picocode assembler, and a picocode and system simulator.

In this model, functions are divided between the control point and the network processor. The control point supports Layer 2 and Layer 3 routing protocols, Layer 4 and Layer 5 network applications, box maintenance, Management Information Base (MIB) collection (in other words, the control point functions as an SNMP agent), and other system management functions. Other functions, such as forwarding, filtering, and classification of the tables generated by the routing protocols, are performed by the dyadic protocol processor units (DPPUs) in each network processor in the system. The Core Language Processors (CLPs) in each DPPU execute the EPC's core software instruction set, which includes conditional execution, conditional branching, signed and unsigned operations, counts of leading zeros, and more.

The network processor has eight major functional blocks:
1. EPC which provides all processing functions for the device;
2. Embedded PowerPC which can act as a control point for the device; the Control Store interface provides up to 128 MB of program space for the PowerPC;
3. Ingress Engueuer/Deguerer/Scheduler (Ingress EDS) provides logic for frames traveling from the physical layer devices to the switch;
4. Egress Enquerer/Dequerer/Scheduler (Egress EDS) provides logic for frames traveling from the switch fabric to the physical layer;
5. Ingress Switch Interface (Ingress SW1) transfers frames from the Ingress EDS to a switch fabric or another network processor (Ingress SW1)
6. Egress Switch Interface (Egress SW1) transfers frames from a switch fabric or another network processor to the Egress EDS;
7. Ingress Physical MAC Multiplexer (Ingress PMM) receives frames from physical layer devices; and
8. Egress Physical MAC Multiplexer (Egress PMM) transmits frames to physical layer devices.

The EPC contains eight dyadic protocol processor units (DPPUs). Each DPPU contains two Core Language Processors (CLPs) that share 10 coprocessors, one coprocessor command bus, and a memory pool. The eight DPPUs share 32 threads, four of which are enhanced, and three hardware accelerators.

Together, the eight DPPUs are capable of operating on up to 32 frames in parallel. They share 32 K words of internal picocode instruction store, providing 2128 million instructions per second (MIPS) of processing power. In addition, the EPC contains a Hardware Classifier to parse frames on the fly, preparing them for processing by the picocode.

Each DPPU contains two icocode rocessors the CLPs that execute the EPC's core instruction set and control thread swapDing and instruction fetching. The two CLPs share dedicated coprocessors that can run in parallel with the CLPs. These dedicated coprocessors are:

a. Checksum: Calculates and verifies frame header checksums.

b. CAB Interface: Controls thread access to the Control Access Bus (CAB) through the CAB Arbiter; the CAB Control, CAB Arbiter, and CAB Interface enable debug access to NP4GS3 data structures.

c. Coprocessor Response Bus: The coprocessor response bus (CRB) is a bus interface and an internal coprocessor that enables the attachment of an external coprocessor with results returned to an internal register. Picocode determines the processing status (busy/not busy) via the busy bit managed by the CRIB coprocessor.

d. Counter: Updates counters for the picocode engines.

e. Data Store
  Interfaces frame buffer memory (ingress and egress directions), providing a 320-byte working area, and
  Provides access to the Ingress and Egress Data Stores.

f. Engueue: Manages control blocks containing key frame parameters; works with the Completion Unit hardware accelerator to engueue frames to the switch and target port output queues.

g. Policy: Determines if the incoming data stream complies with configured profiles.

h. String Copy: Accelerates data movement between coprocessors within the shared memory pool.

i. Tree Search Engine: Performs pattern analysis through tree searches (based on algorithms provided by the picocode) and read and write accesses, all protected by memory range checking: accesses Control Store memory independently.

j. Semaphore Manager: Assists in controlling access to shared resources, such as tables and control structures, through the use of semaphores; grants semaphores either in dispatch order (ordered semaphores) or in request order (unordered semaphores).

As can be seen from the above summary, the NP consists of several different processing elements, each of which has its own characteristic power and performance curve. For instance, an NP typically includes one imbedded control point processor (CPP) shown in FIG. 1-2 as the Embedded 405 PowerPC. The CPP handles initialization, table updates and special packet processing tasks. Assuming this is a CMOS (complimentary metal-oxide semiconductor) device, its power may be controlled using several methods already being employed in the mobile computing industry, i.e. clock throttling, clock stop and input voltage reduction. ;All of these power control methods may be used by the PM state machine; however, the control algorithm must take into account the performance recovery time associated with each method and the impact that a reduction in control processor performance can have on all other processing elements of the NP.

Another NP processing element is the general purpose packet processor. An NP will typically contain dozens or even hundreds of these processors as a means of boosting the performance of the NP by spreading the packets across the packet processors in a multiprocessing approach. Each of these processors has an input queue associated with it such that the utilization of the packet processor can be determined by looking at the arrival rate of packets into the queue. A packet dispatch unit in the NP distributes the packet workload evenly across all of the packet processors. The collective utilization of all of the packet processors, therefore, can be approximated by measuring the utilization of one or a few processors. Also, assuming that the packet processors are identical in function, i.e. homogeneous, they are treated as a single entity and their total power consumption is regulated by starting and stopping individual processors. A calculated utilization threshold can be used by the PM state machine algorithm to determine when additional packet processors must be started or when packet processors are not needed and may be stopped. For the NP design case where all packet processors are not homogeneous, then groups of packet processors of the same type may be treated as a single processing entity in the same way.

Other continuously clocked, homogeneous elements within an NP may be controlled in the same fashion, such as packet memory control units, scheduling queues, FIFO devices and Ingress/Egress port interfaces.

Some external interfaces to the NP, such as MAC (media access control) port interfaces with free running clocks, are typically shut down when not in use. The PM state machine can shut down clocks and disable drivers to unused ports. It can also monitor certain interface signals which, when activated by an external attachment, indicate that the port should be enabled and that the interface clock should be started.

All clocked processing elements within the NP have a recovery time associated with them which specifies the time required to switch from a low power state to a higher power or full power state. The recovery time for each type of processing element must be factored in the algorithms used by the PM state machine in order to adjust the reaction time to changes in utilization (first derivative of the control function) in order to minimize negative performance impacts. A smoothing function must be used in the control algorithm to account for the processing element recovery time. The PM state machine detects when an NP processing element is accessed and uses this information to calculate a current access frequency. The current access frequency or utilization value is compared to a previously calculated and continuously updated threshold frequency. The threshold frequency is representative of the access pattern, e.g., uniform or sporadic, and is computed from equations that include adjustable gain factors. During operation of the processing element, the appropriate power-save mode is entered when the current access frequency falls below the threshold frequency. The PM state machine algorithm can also adapt dynamically to varying workload situations, thereby saving more energy without degrading performance. This is accomplished by adjusting the gain factors in response to tracking the actual performance/utilization of the NP, thereby changing the processing element threshold frequency. The same PM state machine algorithm also determines when to exit a power-save mode, i.e. re-start processing elements. Details of this algorithm are described in U.S. Pat. No. 5,954,820 entitled PORTABLE COMPUTER WITH ADAPTIVE DEMAND-DRIVEN POWER MANAGEMENT, the teachings of which are incorporated herein.

The present invention describes a PM state machine which, when combined with the referenced PM state control algorithm, can (a) control the power state of any element within the network processor, (b) select from any number of intermediate power states for a single element, (c) control each processing element individually based on unique energy saving and recovery time characteristics for each element, and (d) account for the dependencies between processing elements when changing PM states.

PM State Machine

The integrated power management unit, IPMU 100 shown in FIG. 1, is a programmable state machine which updates power management (PM) state information at regular time intervals for all processing elements within the network processor. The processing elements include the embedded control processors, general purpose packet processors, co-processors, CAMS and other function accelerators, memory control units, queue and FIFO elements, ingress and egress port interfaces, switch interfaces, and host control bus interfaces, such as PCI. Each processing element has associated with it, a usage indication signal, one or more power control signals, i.e. on, off, standby, and possibly control signals, which change its operational characteristics based on PM state changes to other processing elements. The list of processing elements which may be controlled by the IPMU is kept in a table along with threshold information for allowable PM states, current PM state and utilization statistics. This table is illustrated as the NP element PM Table 104 attached to the PM activity monitor 106. The PM activity monitor 106 collects utilization information 114 from each processing element, feeds the information into a PM state change algorithm and compares the results to predetermined threshold values to determine the number of packet processors which need to be active, as well as the optimum speed/power state for those elements with programmable clock states, i.e. the control point processor. Adjustable parameters used to tune the algorithms run by the PM activity monitor 106 are stored in the function parameter store 108.

If a PM state change is warranted because of a change in NP utilization, then the NP element PM state controller 110 is activated and the logic sets the appropriate power control signals 116 to the correct processing element(s). The PM state controller 110 uses an NP element state control table 112 that contains information on which control signals to activate to one or more NP processing elements according to an action specified by the PM activity monitor 106. PM state changes to some processing elements can affect the operation of other processing elements. For example, the NP dispatcher unit 118 is affected by which packet processors are activated and packet processors are affected by the power state of tree search engines. Logic in the PM state controller 110 maintains the operational integrity of the NP for every PM action.

Operation

Figure 2:
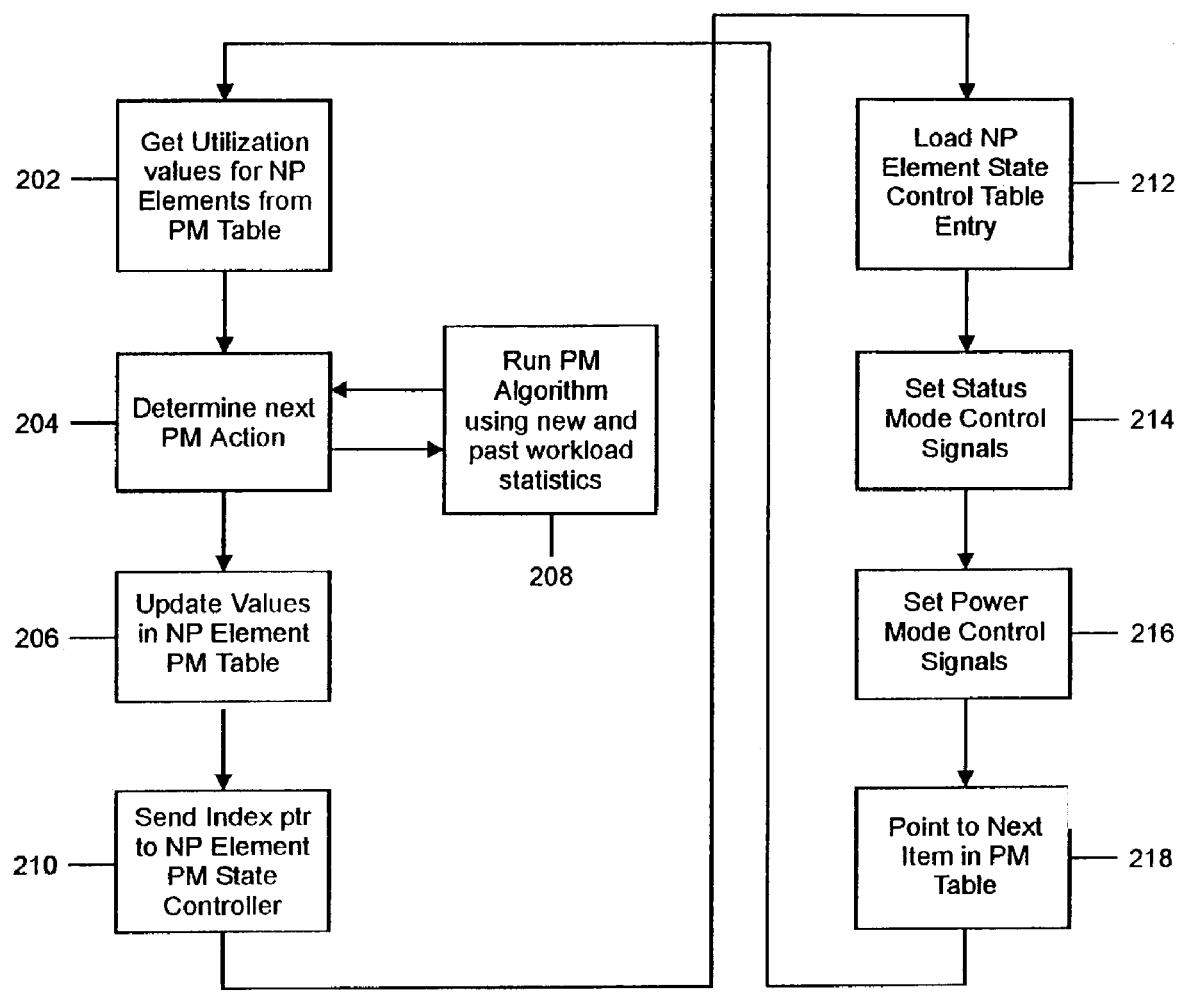
FIG. 2 is a flow diagram illustrating the generation of NP power management state information.

FIG. 2 shows the process of using utilization data from NP processing elements to generate NP power management state information. These processing elements are arranged in a typical NP generally in accordance with the description in the aforementioned document entitled "IBM PowerNP NP4GS3 Network Processor". A direct example of the NP power management can be shown by the control of active packet processors within an NP based on per-unit packet activity.

The PM activity monitor (106 in FIG. 1) periodically obtains at 202 the current utilization values of each processing element listed in the NP element PM table (104 in FIG. 1). The utilization value for a packet processor is determined by choosing a time window and counting the number of input queue accesses that occur within that time window. The PM activity monitor then determines the next PM action (204) by running the PM algorithms (208) using past and new workload statistics. The NP element PM state table is then updated (206) with current values. A new index pointer is then sent at 210 to the NP element power management state controller. Using the index pointer, a new entry is loaded at 212 into the NP element state control table. The updated table then sets updated status mode control signals (214) followed by updated power mode control signals (216). Then, the next processing element in the PM Table is selected (218) and its utilization values are obtained (202) as the entire cycle is repeated to update the NP power management state information.

Figure 3:
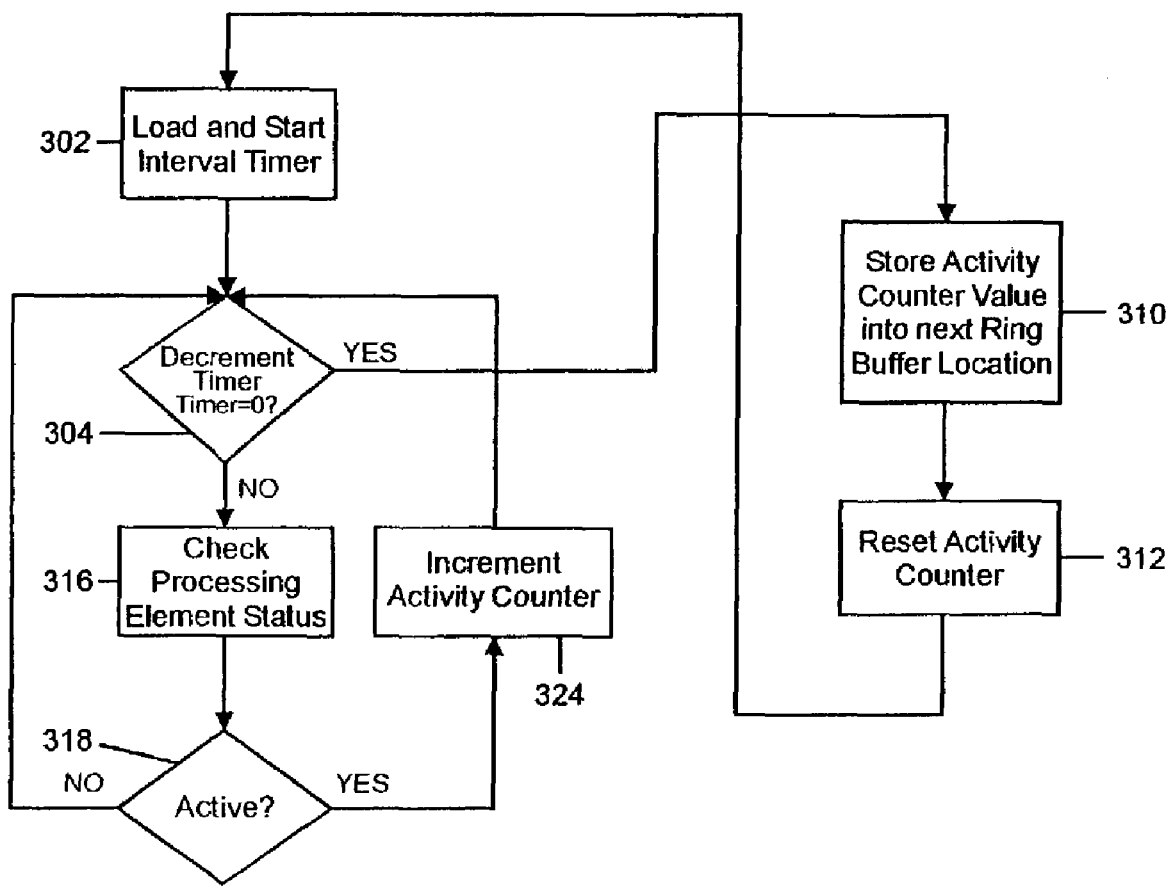
FIG. 3 is a flow diagram illustrating a process for sampling the utilization of processing elements within the network processor.

FIG. 3 shows a flow chart of the polling process of FIG. 2. The method for gathering utilization data could also be interrupt driven. The polling process is repeated or duplicated for each packet processor or other processing element that is being monitored in the NP. An interval counter is loaded and started at 302. As long as a processing element is active, its status is constantly being checked. Each time it is checked, it causes one count to be subtracted from decrement timer 304. If the timer does not reach zero, the status of the processor element is checked at 316. If the element is determined to be active at 318, the activity counter is incremented by one at 324. The incremented value is again routed to the decrement timer 304 where the cycle is repeated. If, however, the processor element is not active, the value in the decrement timer 304 is again reduced. When decrement timer reaches zero, a new activity counter value is stored in the next location in the ring buffer at 310. The activity counter is then reset at 312 and the interval timer is reloaded and restarted for the next processing element.

Figure 4:
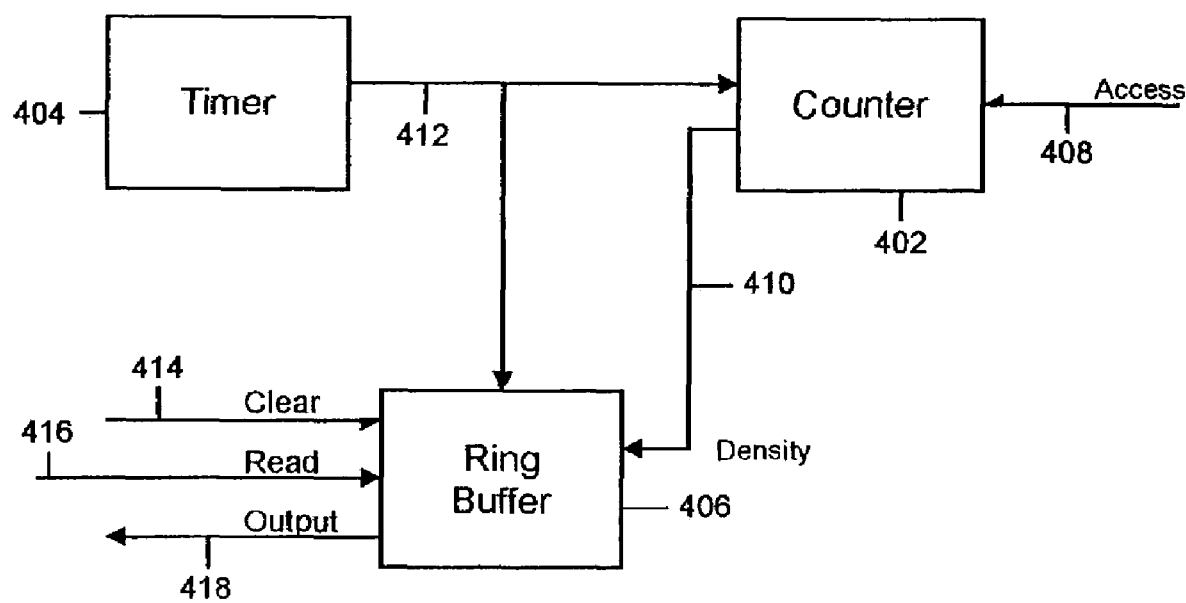
FIG. 4 is a block diagram illustrating a system configuration for setting the power mode of a component based on the frequency of accesses.

FIG. 4 shows a configuration for use in implementing the process of FIG. 3. The counter 402, timer 404 and ring buffer elements 406 may be implemented in hardware or software. An access signal 408 is sent to the counter 402 each time there is a single packet processor access from the input queue. The accesses are counted continuously and the utilization value in the counter is output as an access density signal 410 connected to a storage location in the ring buffer 406. The end-of-window signal 412 from the timer determines when the utilization value is written to the next storage location in the ring buffer and when the counter is reset. The ring buffer 406 stores a running history of packet processor utilization values equal to the number of storage locations in the buffer. The minimum number of values is two; however, a larger number of utilization values insure greater statistical accuracy for the utilization threshold. In addition to the inputs from the timer and counter, the ring buffer 406 has inputs 414 to clear an entry and a 'read' input 416. It also has an output 418 to be described more fully in connection with FIG. 5. The activity measurement algorithm illustrated by FIGS. 3 and 4 can be used to store utilization values for any processing element as long as that element has at least one status signal indicating when it is active and when it is not active. The threshold computation algorithm illustrated in FIG. 5 works with the activity values collected by the algorithm in FIG. 3 for an individual processing element.

The PM activity monitor (106 in FIG. 1) maintains a utilization threshold value for each processing element listed in the PM table, as well as a link to a ring buffer (406 in FIG. 4) for each power mode. The ring buffers contain past utilization values that are used to update a utilization threshold for a specific power mode. The activity monitor 106 gets utilization values 202 and compares the current utilization value, ut, against the utilization threshold value, tf, to determine the next PM action (204 in FIG. 2). A PM action may or may not correspond to the processing element in the PM table that was just sampled. In the case of power management for packet processors, a utilization threshold crossing condition indicates that other packet processors should be brought online or offline depending on a high or low crossing. A crossing below the utilization threshold indicates that one or more packet processors should be taken offline as soon they are idle. A crossing above the utilization threshold indicates that one or more packet processors should be brought online. The definition of which packet processors are started or stopped based on the utilization threshold crossing for a specific power mode is contained in the logic of the NP element PM state controller (110 in FIG. 1).

It is possible to detect periodic accesses to the packet processors from their utilization values. Enter and exit power saving modes can then be selected in anticipation of the beginning and end of a periodic access. An example of a periodic access is a long burst of network traffic entering the NP through a network port. The packets arrive and are processed at regular intervals corresponding to the maximum bandwidth of the port and the distribution of packets across the packet processors by the NP packet dispatcher unit. The ability to exit a power saving mode and start up additional packet processors just prior to the beginning of a periodic access improves the NP performance by reducing packet processing latency at the start of the traffic burst. The ability to enter a power-save mode by stopping one or more packet processors after a periodic access ends, increases the energy savings since the power-save mode is entered with a shortest possible delay.

In one embodiment, component access patterns are assumed to fall into two categories: uniform access patterns and sporadic access patterns. A uniform access pattern is defined as one for which the set of access frequencies is well defined statistically. For example, the mean and standard deviation of access frequencies may be computed. The access frequencies can be considered well defined if the standard deviation is some fraction of the mean. Otherwise, the access pattern is considered sporadic, i.e., not well defined by a mean and standard deviation. In the uniform case, the access pattern is considered to have ended if the observed access frequencies drop below the mean minus some multiple of the standard deviation. This is equivalent to choosing a probability that observed access frequency belongs in the observed access pattern. It is also possible to use a fraction of a minimal observed access frequency as an estimate of the end of the access pattern. The underlying principle is the use of the recent access frequencies to characterize the access pattern, and then the determination of a threshold frequency from this pattern. It is then assumed to be highly probable that the access pattern has ceased when the access frequency crosses this threshold frequency.

Figure 5:
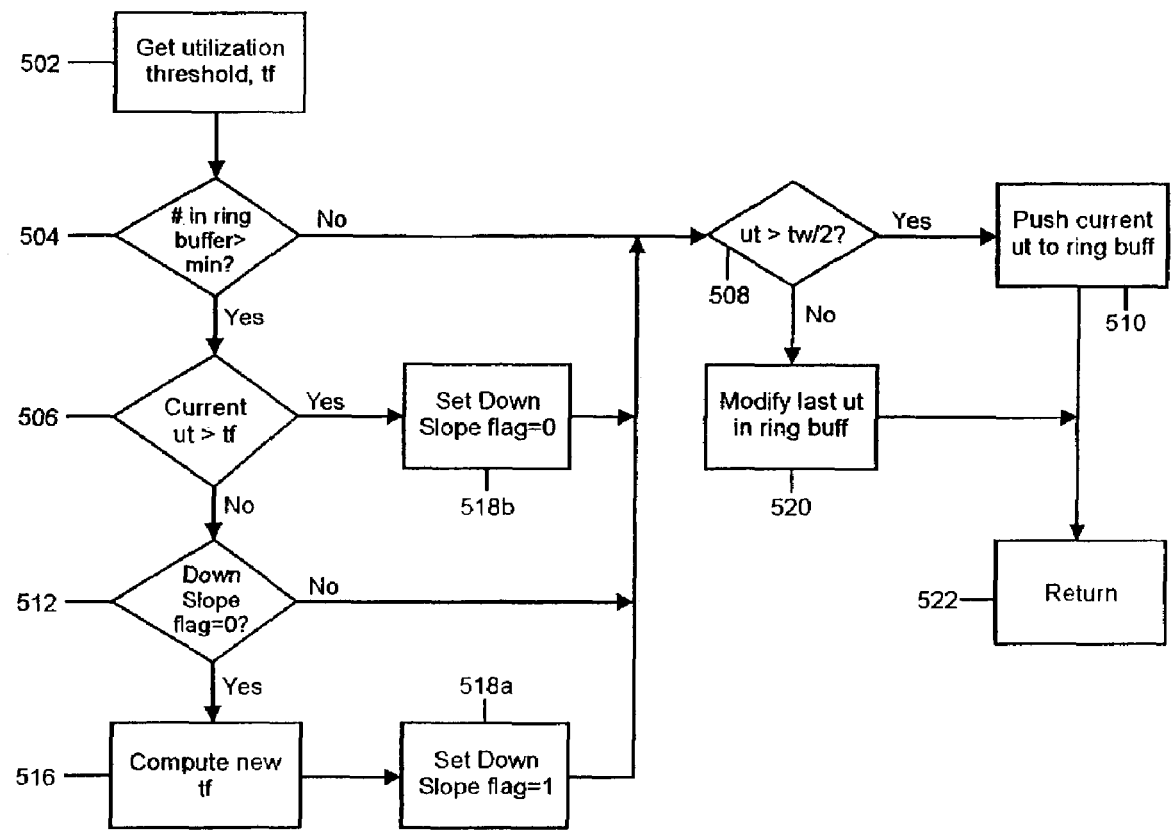
FIG. 5 is a flow chart illustrating the computation of threshold frequency using prior access frequencies stored in a ring buffer.

FIG. 5 is a flow chart showing the process for computing and adjusting the utilization threshold, tf, for a power-save mode. The current utilization threshold value, tf, is obtained at 502. The most recent utilization values, ut, are obtained as the output 418 of the ring buffer 406 in FIG. 4. The number of values in the ring buffer is compared with the minimum threshold value at 504. If the number of values does not exceed the minimum, and if the current utilization value is found at 508 to be greater than half the sample time window, (tw), the store/modify branch of the process continues to store the current utilization value in the ring buffer at 510. If the utilization value does not exceed one half of the threshold value, (tf/2), then the last stored utilization value in the ring buffer is modified in step 520. At step 522, the algorithm returns to the activity monitor 106 in FIG. 1 to fetch another threshold value, tf, for the next processing element mode in the sequence. This algorithm is used to check and update all threshold values for all processing elements listed in the NP element PM table 104 in FIG. 1

If the number of utilization values in the ring buffer is determined at 504 to exceed the minimum threshold value, the current utilization value, ut, is compared to the utilization threshold, tf, at 506. If ut>tf, then a utilization peak has not been reached yet. There is no need to compute a new utilization threshold and the slope flag is set to zero at 512 to clear it. If the ring buffer contains a sufficient number of utilization values, and a new utilization peak has been found indicated by a change in slope from ut>tf to ut<=tf, then a new threshold frequency, tf, is computed at 516.

The down-slope flag is set to 1 at 518a to indicate whether the algorithm is searching for an increase in packet processor activity or a decrease in activity. A new utilization threshold is calculated only on the first occurrence of a utilization value which is lower than the utilization threshold after the previously sampled utilization value was greater than the utilization threshold. This condition indicates that a new local maximum has been found for packet processor utilization. Immediately after a new utilization threshold is calculated, the flag is set (518) indicating that NP activity is on a downward slope from a new peak. The flag remains set at 1 as long as subsequent utilization values are less than or equal to the utilization threshold. The utilization threshold remains constant as long as the flag is set, indicating a downward slope in packet processor utilization. As soon as a sampled utilization value is compared and found to be greater than the utilization threshold, then the algorithm assumes that activity is now on an upward slope and begins searching for a new maximum. In this way, the algorithm is always searching for a new peak utilization threshold for the processing element.

The utilization threshold is computed using a simplified calculation for the mean and standard deviation of the utilization values contained in the ring buffer. Only the maximum and minimum values contained in the ring buffer are used in the calculations. Two formulas are used to calculate two different utilization thresholds, t1 and t2. One formula tends to produce the greater value when the difference between the largest and the smallest utilization values in the ring buffer is small, indicating that the packet processor activity is uniform. The other formula tends to calculate the greater value when there is a large difference between the maximum and minimum utilization values, indicating sporadic packet processor activity. The greater of the two calculated values becomes the new utilization threshold, tf. Two gain constants are used in the formulas to control the sensitivity of the algorithm, g1 and g2. An increase in the value of either gain constant results in a lower calculated utilization threshold for the corresponding formula. In this way, the threshold algorithm can be adjusted to tune the power management behavior.

$t1 = (maxut+minut)/2 - g1*(maxut-minut)$ $t2 = minut/g2$ $t1 = \max(t1, t2)$

The monitor, in effect, takes active/idle statistics that it has collected over time for each NP element and runs those through utilization algorithms to determine the best PM state for each element which will optimize power and performance characteristics for the whole NP system. The utilization threshold will tend to be a low value when packet processing activity is sporadic which will tend to put the NP into a high performance mode of operation. The utilization threshold will tend to either increase or remain constant when packet processing activity is uniform. The performance/power mode of the NP will tend to level out at its most optimum setting while packet processing activity is uniform. The algorithm run by the monitor can be tuned through programmable gain constants held in the function parameter store. In this way, the NP system can be programmed for a range of power management operation from maximum performance to maximum power savings. The utilization threshold algorithm run by the monitor maintains different threshold values for every processing element and for every power mode.

Figure 6:
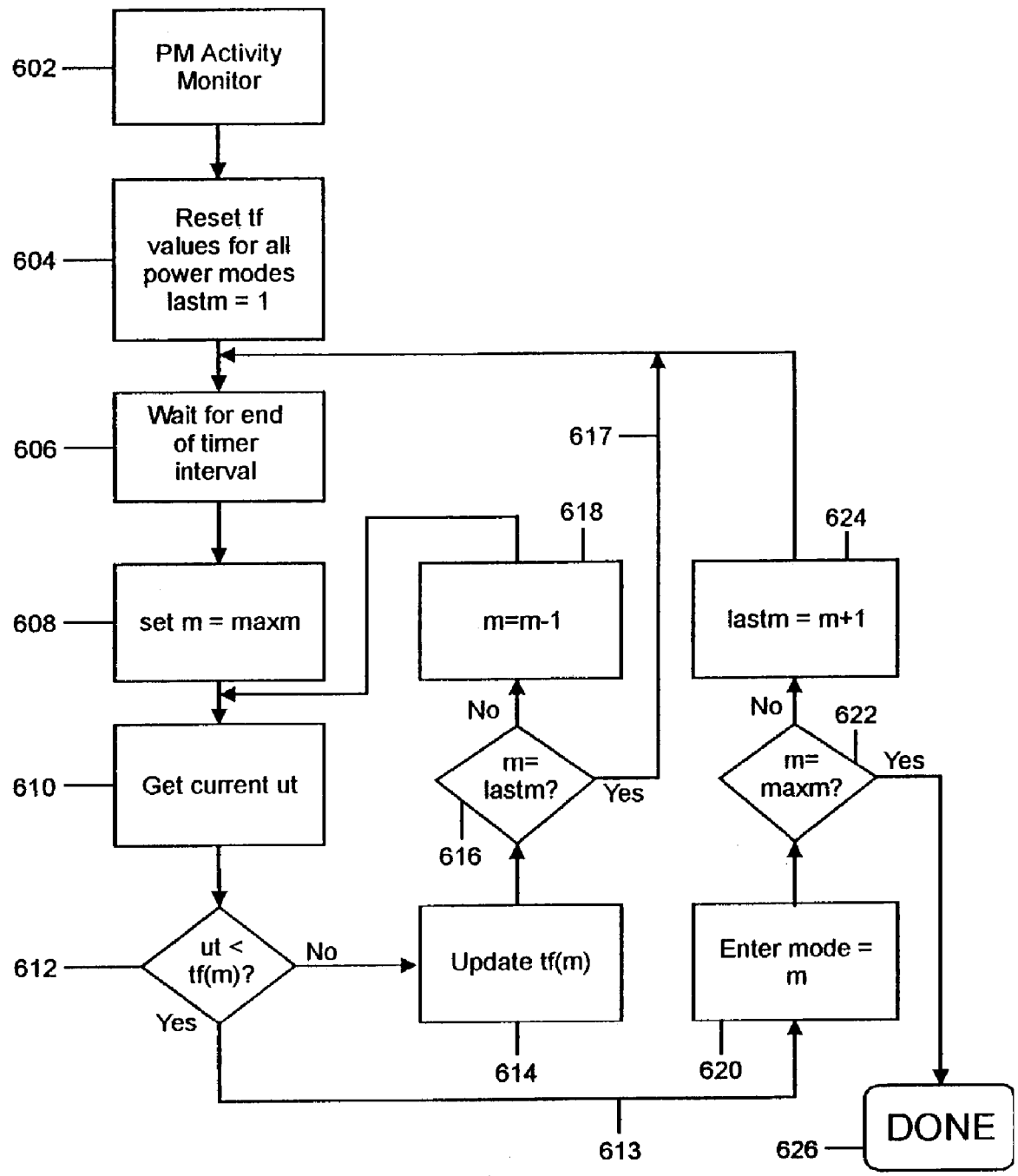
FIG. 6 is a flow chart illustrating the computation of the access frequency and comparison to a threshold frequency for determining when to enter a power-save mode.

FIG. 6 shows the logic flow used by the PM activity monitor 602 to find the lowest possible power mode for a single processing element. The process is capable of working with one or more power saving modes for a processing element and it assumes that there is a separate threshold value calculated for each mode. At step 604, the threshold frequencies for all power modes, last mode (lastm), are set to 1. Then the process waits for the shortest window timer to time out at step 606. Each power save mode is presumed to have a unique window time. Starting with the lowest power mode (highest power savings), maxm 608, the logic obtains (610) and compares (612) the current activity, ut, to the activity threshold, tf(m), for that specific power-save mode. If the current activity is equal to or more than the threshold value, then the current activity value is stored, a new threshold value is calculated in step 614 for the power mode and the next best power mode is checked (616). If there are no more power modes available for the processing element, then the process goes back along path 617 to the beginning to check for the lowest power mode again. If there are additional power modes, the next lower mode is selected at 618 and the current activity is compared to the threshold value.

If the current activity is less than the threshold value, (ut<tf(m)), then an action code is sent along path 613 to the NP element PM state controller to program the new and most energy-saving power state at step 620. The NP element PM state controller receives PM actions from the monitor which instruct it to program new PM states for individual NP processing elements, e.g. packet processors. Different types of NP elements may have different PM state transition requirements besides On and Off, i.e. On>Standby> Off or OnH>OnL>Off. These requirements are specified in the NP element PM table along with dynamic utilization thresholds for each PM state change and the current power mode of each processing element. If the current mode is maxmode, step 622 indicates that the process is done (626). If there are still power-save modes available for testing, the last mode is updated to mode+1 (624) to show that all power-save modes less than or equal to the mode that was entered are no longer under consideration. Step 606 is then entered again.

Figure 7:
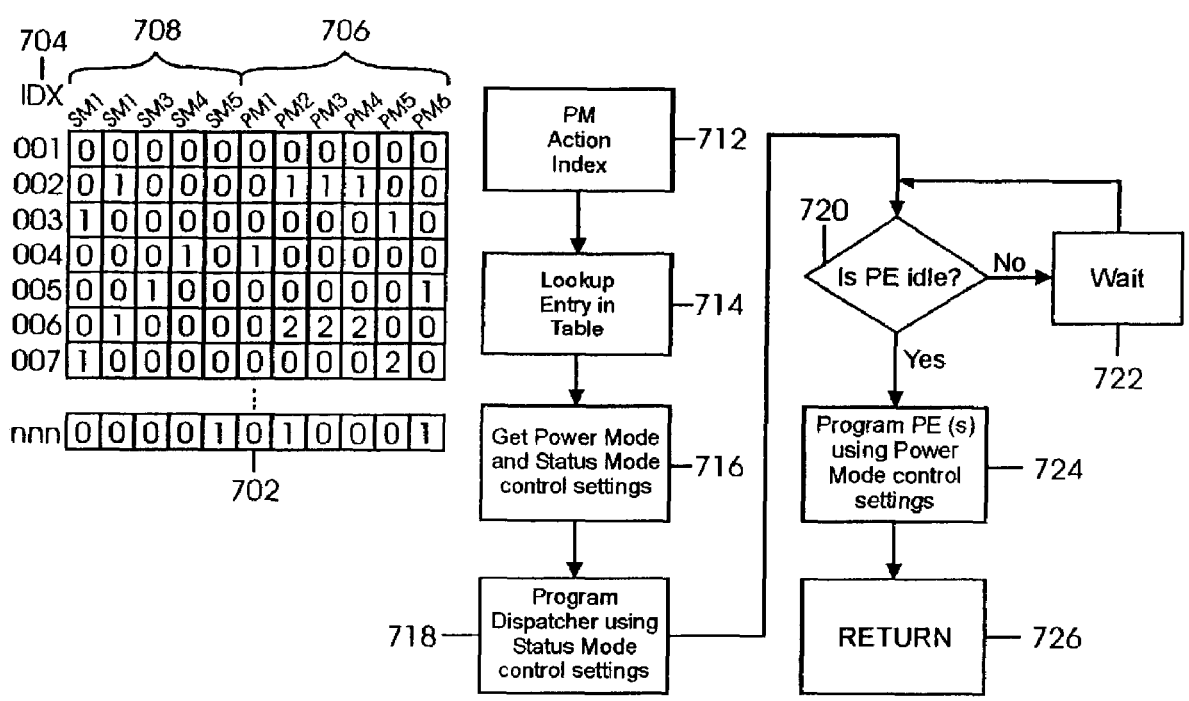
FIG. 7 is a flow chart showing the use of the PM state controller to activate and deactivate power control signals to packet processors.

FIG. 7 shows the process used by the PM state controller to activate or deactivate power control signals to the packet processors. Each action index, IDX 704, received from the PM monitor corresponds to an entry in the NP element state control table 702. Each table entry identifies which power mode signals, PMx 706, and status mode, SMx signals 708, are activated for a specific PM action at 712 and 714. At 716, the PM state controller loads the power mode and status mode values obtained from the table 702. Power mode signals set one or more packet processors to a new power state and status mode signals change the operating characteristics of other, working processing elements at 724 affected by the new power mode, such as the dispatch unit 718. The PM control process includes a wait loop 722 to check for an idle condition 720 of the processing element before setting the packet processor power state. The PM state controller signals the NP dispatch unit 718 using status mode signals to indicate which packet processors are online or offline. The dispatch unit is updated before the packet processor is programmed so that no new packets are dispatched to the packet processor while the PM state controller is setting the new power mode.

Figure 8:
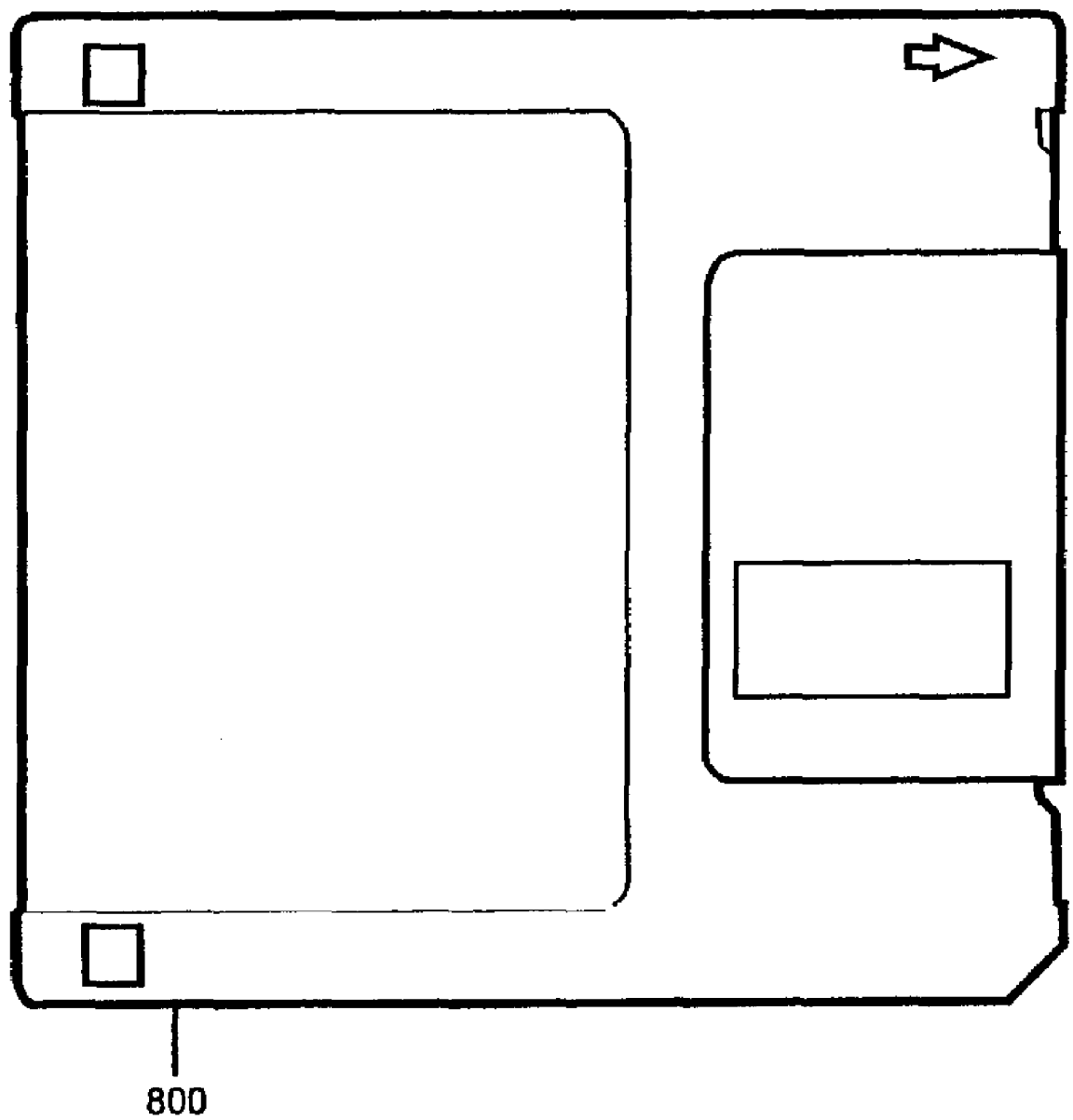
FIG. 8 is a magnetic disc representing the power consumption management medium of the present invention.

FIG. 8 shows a computer-readable medium in the form of a floppy disc 800 for containing the software implementation of the program to carry out the various steps of managing the power consumption of a network processor according to the present invention.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What we claim is:

1. A method of controlling power state of multiple processing elements in a network processor embedded in a semiconductor chip, wherein each of the processing elements has its own characteristic power and performance curve, and at least some of the processing elements are clocked, comprising the steps of:
   providing each of the processing elements with a usage indication signal;
   using a programmable power management state machine to monitor the utilization of each of the processing elements using said usage indication signal and to output an access density signal to a storage location in a ring buffer; and
   utilizing said state machine and a state control algorithm to control the power state of each of the processing elements based upon its past usage and predicted future utilization, wherein the performance recovery time which is associated with each of the clocked processing elements and which specifies the time required to switch between a low power state and a higher power state, is factored into the step of controlling the power state of the respective processing element.

2. The method according to claim 1 wherein the step of utilizing the state machine and the algorithm includes the step of determining when the respective processing element is to be set to the lower or the higher power state based upon the prior utilization of the processing element and its interdependencies with other processing elements.

3. The method according to claim 2 wherein the processing element is a packet processor.

4. The method according to claim 2 wherein the interdependencies are between a dispatching unit and at least one packet processor.

5. The method according to claim 2 including the additional steps of calculating and adjusting a utilization threshold value for each processing element, and comparing current access frequency to a previously calculated value.

6. The method according to claim 1 further including the use of the state machine and the algorithm to adjust gain factors in response to actual performance and utilization of the network processor.

7. The method according to claim 6 including the step of using the control algorithm having an input into which the utilization is fed, and output results of which are compared to a utilization threshold value for the processing element.

8. The method according to claim 7 further including the use of a status mode control signal as an indicator to one or more processing elements that a power state change has occurred and wherein at least one of the processing elements modifies its operation in response to the change in power state.

9. The method according to claim 7 including the use of a power control signal to change the power control setting of a processing element in response to a change in the network processor use.

10. The method according to claim 1 including the use of logic in the programmable state machine to maintain the operational integrity of the network processor.

11. The method according to claim 1 further including a smoothing function in the algorithm to account for the recovery time of each of the clocked processing elements.

* * * * *